United States Patent
Xiao

(10) Patent No.: US 9,609,907 B2
(45) Date of Patent: Apr. 4, 2017

(54) HEATED SHOE

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Jian-Ming Xiao, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 65 days.

(21) Appl. No.: 14/580,597

(22) Filed: Dec. 23, 2014

(65) Prior Publication Data

US 2016/0081423 A1  Mar. 24, 2016

(30) Foreign Application Priority Data

Sep. 22, 2014 (CN) .......................... 2014 1 0483854

(51) Int. Cl.
| | |
|---|---|
| *A43B 7/02* | (2006.01) |
| *A43B 7/04* | (2006.01) |
| *A43B 3/00* | (2006.01) |
| *H02K 7/06* | (2006.01) |
| *H02K 7/18* | (2006.01) |
| *F03G 5/06* | (2006.01) |

(52) U.S. Cl.
CPC .............. *A43B 7/04* (2013.01); *A43B 3/0005* (2013.01); *A43B 7/02* (2013.01); *F03G 5/06* (2013.01); *H02K 7/06* (2013.01); *H02K 7/1853* (2013.01)

(58) Field of Classification Search
CPC .... A43B 7/02; A43B 7/04; A43B 7/06; A43B 3/0005; H02K 7/06; H02K 7/1853; F03G 5/06

See application file for complete search history.

(56) References Cited

U.S. PATENT DOCUMENTS

| | | | | |
|---|---|---|---|---|
| 3,963,548 | A | * | 6/1976 | George .................. A47H 23/00 156/227 |
| 5,167,082 | A | * | 12/1992 | Chen .................... A43B 1/0036 219/211 |
| 5,341,103 | A | * | 8/1994 | Dasgupta ............... G01N 27/60 324/454 |

(Continued)

FOREIGN PATENT DOCUMENTS

| | | |
|---|---|---|
| CN | 2264493 Y | 10/1997 |
| CN | 201349589 Y | 11/2009 |

(Continued)

*Primary Examiner* — Anna Kinsaul
*Assistant Examiner* — Jocelyn Wu
(74) *Attorney, Agent, or Firm* — Zhigang Ma

(57) ABSTRACT

A shoe includes a sole, an actuator and a transducer. The actuator is mounted on one side of the sole. The transducer is mounted within the sole and includes a micro-motor, a link structure and a heater. The link structure is positioned between the micro-motor and the actuator and configured to move the micro-motor to generate electric energy. The heater is electrically coupled to the micro-motor and configured to convert the electric energy provided by the micro-motor to heat. When the actuator deforms or restores its deformation, the link structure moves thereby enabling the micro-motor to generate electric energy for the heater.

13 Claims, 1 Drawing Sheet

(56) References Cited

U.S. PATENT DOCUMENTS

| | | | | |
|---|---|---|---|---|
| 6,255,799 | B1* | 7/2001 | Le | A43B 3/00 |
| | | | | 219/211 |
| 6,556,222 | B1* | 4/2003 | Narayanaswami | G04G 9/0064 |
| | | | | 368/295 |
| 2008/0290743 | A1* | 11/2008 | Kalik | H02K 7/1892 |
| | | | | 310/37 |
| 2011/0107771 | A1* | 5/2011 | Crist | A43B 3/0005 |
| | | | | 62/3.3 |
| 2012/0260522 | A1* | 10/2012 | Shi | A43B 1/0054 |
| | | | | 36/2.6 |
| 2012/0260531 | A1* | 10/2012 | Shi | A43B 3/0015 |
| | | | | 36/102 |
| 2014/0000130 | A1* | 1/2014 | Crist | A43B 7/04 |
| | | | | 36/136 |
| 2014/0145450 | A1* | 5/2014 | Stanton | F03G 5/06 |
| | | | | 290/1 C |

FOREIGN PATENT DOCUMENTS

| | | |
|---|---|---|
| CN | 201775069 U | 3/2011 |
| CN | 102204731 A | 10/2011 |
| TW | M344049 U | 11/2008 |
| WO | 0221955 A1 | 3/2002 |

\* cited by examiner

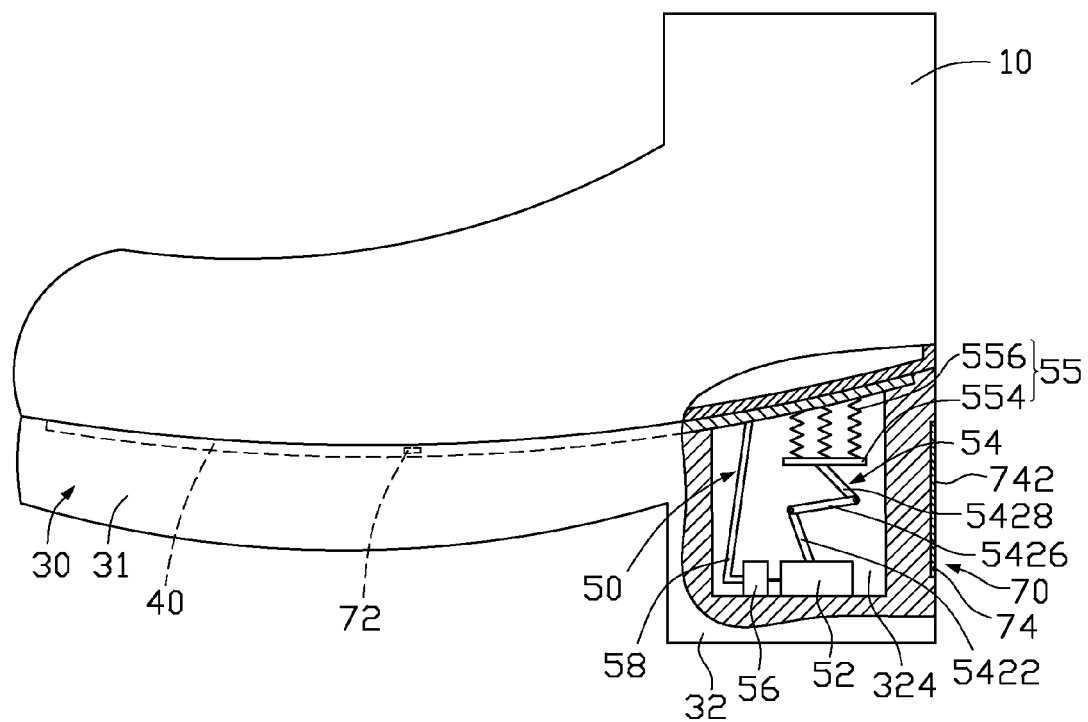

HEATED SHOE

FIELD

The subject matter herein generally relates to shoes, and particularly to heated shoes.

BACKGROUND

In cold days, a heated shoe can be used to keep the foot warm.

BRIEF DESCRIPTION OF THE DRAWINGS

Implementations of the present technology will now be described, by way of example only, with reference to the attached FIGURE.

The FIGURE is a part sectional view of an embodiment of a heated shoe.

DETAILED DESCRIPTION

It will be appreciated that for simplicity and clarity of illustration, where appropriate, reference numerals have been repeated among the different FIGURES to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a shoe that can include a shoe upper, a sole, an actuator and a transducer. The sole can be mounted on the bottom of the shoe upper. The actuator can be mounted on a side of the sole. The transducer can be mounted within the sole and include a micro-motor, a link structure and a heater. The link structure can be positioned between the micro-motor and the actuator and configured to move the micro-motor to generate electric energy. The heater can be electrically coupled to the micro-motor and configured to convert the electric energy provided by the micro-motor to heat. When the actuator deforms or restores its deformation, the link structure moves enabling the micro-motor to generate electric energy for the heater.

The present disclosure is further in relation to a shoe that can include a sole, an actuator, a transducer and a thermostat. The actuator can be mounted on a side of the sole. The transducer can be mounted within the sole and include a micro-motor, a link structure and a heater. The link structure can be positioned between the micro-motor and the actuator and configured to move the micro-motor to generate electric energy. The heater can be electrically coupled to the micro-motor and configured to convert the electric energy provided by the micro-motor to heat. The thermostat can include a temperature sensor and a temperature controller. The temperature sensor can be mounted on the actuator and configured to detect a temperature of the shoe. The temperature controller can be mounted on the sole and coupled to the temperature sensor. The temperature controller is electrically coupled to the micro-motor. The temperature controller can be configured to stop or activate the micro-motor to work again according to the temperature detected by the temperature sensor.

The FIGURE illustrates an embodiment of a shoe 100. The shoe 100 can include a shoe upper 10, a sole 30, an actuator 40, a transducer 50, and a thermostat 70. The sole 30 can be mounted on a bottom of the shoe upper 10. The actuator 40 can be mounted on a side of the sole 30 adjacent to the shoe upper 10. The transducer 50 can be received in the sole 30. The thermostat 70 can be electrically coupled to the transducer 50. The actuator 40 can be configured to activate the transducer 50 to generate heat. The transducer 50 can be configured to convert kinetic energy generated by movement to thermal energy. The thermostat 70 can be configured to control the temperature of the shoe 100 at an approximate predetermined temperature.

The sole 30 can include a base 31 and a heel 32 which can be coupled to an end of the base 31. The heel 32 can define a chamber 324. The actuator 40 can cover an opening of the chamber 324 facing the shoe upper 10. The actuator 40 can be made of elastic material, thus, the actuator 40 can be capable of deforming and automatically restoring its initial shape after deformation. The actuator 40 can be made of heat conduction material and spread all over a side of the sole 30 adjacent to the shoe upper 10, which enables the actuator 40 to uniformly and quickly transfer the thermal energy generated by the transducer 50 to the shoe upper 10.

The transducer 50 can be received in the chamber 324, and can include a micro-motor 52, a link structure 54, a buffering assembly 55, a heater 56, and a heat-transfer tube 58.

The micro-motor 52 can be fixedly mounted on a bottom wall of the chamber 324, and can include a rotor (not shown). The link structure 54 can be positioned between the micro-motor 52 and the actuator 40. Thus, when the actuator 40 deforms or restores its deformation, the link structure 54 can be capable of moving the rotor of micro-motor 52 to generate electric energy. In the illustrated embodiment, the link structure 54 can include a first coupling rod 5422, a second coupling rod 5426 and a third coupling rod 5428 arranged in order. A first end portion of the first coupling rod 5422 can be coupled to the micro-motor 52. A first end portion of the second coupling rod 5426 can be pivoted to a second end portion of the first coupling rod 5422 away from the micro-motor 52. A first end portion of the third coupling rod 5428 can be pivoted to a second end portion of the second coupling rod 5426 away from the first coupling rod 5422.

The buffering assembly 55 can be positioned between the link structure 54 and the actuator 40, thereby enabling the link structure 54 to receive a uniform pressure. The buffering assembly 55 can include a supporting member 554 and at least one elastic member 554. The supporting member 554 can be substantially a rectangular plate. A side of the supporting member 554 adjacent to the link structure 54 can be fixedly mounted to a second end portion of the third coupling rod 5428 away from the second coupling rod 5426. Two opposite ends of the elastic member 556 can be fixed to a side of the supporting member 554 away from the link structure 54 and the actuator 40, respectively. In this exemplary embodiment, the buffering assembly 55 can include three elastic members 556 arranged spaced from each other.

The heater 56 can be electrically coupled to the micro-motor 52, and configured to convert the electric energy provided by the micro-motor 52 to thermal energy. The heater 56 can be at least one heating wire. Two opposite ends of the heat-transfer tube 58 can be coupled to the heater 56 and the actuator 40, respectively. The heat-transfer tube 58 can be configured to transfer the thermal energy from the heater 56 to the actuator 40.

The thermostat 70 can include a temperature sensor 72 and a temperature controller 74. In this exemplary embodiment, the temperature sensor 72 can be mounted on the actuator 40 and configured to detect a temperature of the shoe 100. The temperature controller 74 can be mounted on the heel 32 and configured to control the temperature of the shoe 100. The temperature controller 74 can be coupled to the temperature sensor 72. The temperature controller 74 can be electrically coupled to the micro-motor 52. The temperature controller 74 can further include a display panel 742 mounted on an outer sidewall of the heel 32 for displaying the temperature of the shoe 100. The display panel 742 can be a touch panel which can be employed to set a predetermined temperature by the user.

In assembly, the micro-motor 52 can be mounted in the heel 32. One end of the link structure 54 can be coupled to the micro-motor 52; the other end of link structure 54 away from the micro-motor 52 can be fixed to the supporting member 554. One end of the elastic member 556 can be mounted on the supporting member 554. The heater 56 can be electrically coupled to the micro-motor 52. The heat-transfer tube 58 can be coupled to the heater 56 and extend toward the shoe upper 10. The actuator 40 can be mounted on a top of the sole 30, and coupled to the elastic member 556 and the heat-transfer tube 58 by its portion adjacent to the heel 32. The temperature sensor 72 can be mounted on the actuator 40. The temperature controller 74 can be coupled to the temperature sensor 72 and electrically coupled to the micro-motor 52.

In use, a predetermined temperature can be set via the temperature controller 74. When a user presses and forces the actuator 40 in the course of walking or exercise, the actuator 40 can be deformed or restore its deformation which allows the elastic member 556 to compress and decompress repeatedly. Thus, the force generated during the movement can be transferred to the supporting member 554 uniformly which moves the supporting member 554 upward and downward to further rotate the link structure 54. Then, the rotating link structure 54 moves the rotor of the micro-motor 52 to generate electric energy. The heater 56 can convert the electric energy provided by the micro-motor 52 into thermal energy. The heat-transfer tube 58 can transfer the thermal energy from the heater 56 to the actuator 40. Then the actuator 40 can transfer the thermal energy into the shoe upper 10 to keep the foot of the user warm. When the temperature sensor 72 detects the temperature of the shoe 100 is higher than the predetermined temperature, the temperature controller 74 can be capable of stopping the micro-motor 52. Then the heater 56 stops working due to a lack of the electric energy, preventing the temperature of the shoe 100 from being too high. When the temperature sensor 72 detects the temperature of the shoe 100 is lower than the predetermined temperature, the temperature controller 74 can activate the micro-motor 52 to work again. Thus, the micro-motor 52 can provide electric energy for the heater 56 to generate heat again. As such, the temperature of the shoe 100 can be kept at an approximate predetermined temperature.

In at least one embodiment, the actuator 40 can only cover the opening of the chamber 324 facing the shoe upper 10. The actuator 40 can be made of non-elastic material as long as the actuator 40 can bend when an external force is applied on it and can restore from the deformation when the external force is removed. The link structure 54 can be directly coupled to the actuator 40 and then the buffering assembly 55 can be omitted. The sole 30 can be thick enough to receive the transducer 50 and then the heel 32 can be omitted. The heat generated by the heater 56 can be directly transferred to the actuator 40 and then the heat-transfer tube 58 can be omitted. The temperature sensor 72 can be located on shoe upper 10. The temperature controller 74 can be located on the shoe upper 10 or in the sole 30. The number of the elastic members 546 can be one, two or more than three. The shoe 100 can also include several buttons mounted on the shoe upper 10 or the sole 30 for setting parameters such as a predetermined temperature or so on.

The embodiments shown and described above are only examples. Many details are often found in the art such as the other features of a heated shoe. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A shoe comprising:
   a shoe upper having a bottom and at least one side;
   a sole mounted on the bottom of the shoe upper;
   an actuator mounted on a side of the sole; and
   a transducer mounted within the sole and, wherein the transducer comprises:
      a micro-motor,
      a link structure coupled to the micro-motor, the link structure configured to move the micro-motor to generate electric energy;
      a buffering assembly located between the link structure and the actuator, the buffer assembly having a supporting member and at least one elastic member; and
      a heater electrically coupled to the micro-motor, the heater configured to convert the electric energy generated by the micro-motor to heat;
   wherein the link structure is positioned between the micro-motor and the actuator, a side of the supporting member of the buffer assembly is coupled to an end portion of the at least one elastic member and another side of the supporting member is coupled to the link structure, and another end portion of the at least one elastic member is coupled to the actuator; and wherein the link structure is configured such that when the actuator deforms or reforms, the at least one elastic member repeatedly compresses and decompresses, and the supporting member moves upward and downward to rotate the link structure and enable the micro-motor to generate electric energy for the heater.

2. The shoe of claim 1, wherein the shoe further comprises a heat-transfer tube having two opposite ends, wherein the two opposite ends of the heat-transfer tube are coupled to the heater and the actuator, respectively.

3. The shoe of claim 1, wherein the link structure comprises a first coupling rod, a second coupling rod and a third coupling rod, a first end portion of the first coupling rod is coupled to the micro-motor, a first end portion of the second coupling rod is pivoted to a second end portion of the first coupling rod away from the micro-motor, a first end portion of the third coupling rod is pivoted to a second end portion of the second coupling rod away from the first coupling rod, and a second end portion of the third coupling rod is fixed to the supporting member.

4. The shoe of claim 1, wherein the actuator is made of heat conduction material, and spread all over a side of the sole adjacent to the shoe upper.

5. The shoe of claim 1, wherein the shoe further comprises a thermostat, the thermostat comprises a temperature sensor mounted on the actuator and a temperature controller mounted on the sole, the temperature controller is coupled to the temperature sensor, the temperature controller is electrically coupled to the micro-motor.

6. The shoe of claim 5, wherein the temperature controller comprises a display panel mounted on an outer sidewall of the sole, the display panel is a touch panel which is employed to set a predetermined temperature or display a temperature of the shoe.

7. The shoe of claim 1, wherein the sole comprises a base and a heel coupled to an end of the base, and wherein the transducer is mounted within the heel.

8. A shoe comprising:
a sole;
an actuator mounted on a side of the sole;
a transducer mounted within the sole, wherein the transducer comprises:
  a micro-motor,
  a link structure coupled to the micro-motor, the link structure configured to move the micro-motor to generate electric energy;
  a buffering assembly located between the link structure and the actuator, the buffering assembly having a supporting member and at least one elastic member; and
a heater electrically coupled to the micro-motor, the heater configured to convert the electric energy generated by the micro-motor to heat; and
a thermostat comprising:
  a temperature sensor mounted on the actuator, the temperature sensor configured to detect a temperature of the shoe; and
  a temperature controller mounted on the sole and coupled to the temperature sensor;
wherein the link structure is coupled between the micro-motor and the actuator, a side of the supporting member of the buffer assembly is coupled to an end portion of the at least one elastic member and another side of the supporting member is coupled to the link structure, and another end portion of the at least one elastic member is coupled to the actuator;
wherein the link structure is configured such that when the actuator deforms or reforms, the at least one elastic member repeatedly compresses and decompresses, and the supporting member moves upward and downward to rotate the link structure and enable the micro-motor to generate electric energy for the heater; and
wherein the temperature controller is electrically coupled to the micro-motor, and the temperature controller is configured to stop or activate the micro-motor according to the temperature detected by the temperature sensor.

9. The shoe of claim 8, wherein the shoe further comprises a heat-transfer tube having two opposite ends, wherein the two opposite ends of the heat-transfer tube are coupled to the heater and the actuator, respectively.

10. The shoe of claim 8, wherein the link structure comprises a first coupling rod, a second coupling rod and a third coupling rod, a first end portion of the first coupling rod is coupled to the micro-motor, a first end portion of the second coupling rod is pivoted to a second end portion of the first coupling rod away from the micro-motor, a first end portion of the third coupling rod is pivoted to a second end portion of the second coupling rod away from the first coupling rod, and a second end portion of the third coupling rod is fixed to the supporting member.

11. The shoe of claim 8, wherein the actuator is made of heat conduction material, and spread all a side of the sole adjacent to the shoe upper.

12. The shoe of claim 8, wherein the temperature controller comprises a display panel mounted on an outer sidewall of the sole, the display panel is a touch panel which is employed to set a predetermined temperature or display a temperature of the shoe.

13. The shoe of claim 8, wherein the sole comprises a base and a heel coupled to an end of the base, and wherein the transducer is mounted within the heel.

* * * * *